(12) United States Patent
Guo et al.

(10) Patent No.: US 11,409,567 B2
(45) Date of Patent: Aug. 9, 2022

(54) APPLICATION MANAGEMENT METHOD AND TERMINAL

(71) Applicant: Huawei Technologies Co., Ltd., Shenzhen (CN)

(72) Inventors: Yuhua Guo, Shanghai (CN); Jing Zhao, Beijing (CN); Wen Huang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/753,523

(22) PCT Filed: Oct. 13, 2017

(86) PCT No.: PCT/CN2017/106199
§ 371 (c)(1),
(2) Date: Apr. 3, 2020

(87) PCT Pub. No.: WO2019/071619
PCT Pub. Date: Apr. 18, 2019

(65) Prior Publication Data
US 2020/0334071 A1 Oct. 22, 2020

(51) Int. Cl.
*G06F 9/50* (2006.01)
*G06F 9/48* (2006.01)
(Continued)

(52) U.S. Cl.
CPC ............ *G06F 9/5022* (2013.01); *G06F 9/455* (2013.01); *G06F 9/45533* (2013.01);
(Continued)

(58) Field of Classification Search
CPC .... G06F 9/455; G06F 9/45533; G06F 9/4558; G06F 9/46; G06F 9/461; G06F 9/48;
(Continued)

(56) References Cited

U.S. PATENT DOCUMENTS

| 8,897,762 B2 | 11/2014 | Cherian et al. |
| 2009/0204965 A1* | 8/2009 | Tanaka .................... G06F 9/545 718/1 |

(Continued)

FOREIGN PATENT DOCUMENTS

| CN | 102298538 A | 12/2011 |
| CN | 102799361 A | 11/2012 |

(Continued)

OTHER PUBLICATIONS

Nohara, T., "Easy iOS/Android mechanism," Nikkei PC, Japan, Nikkei BP, Jan. 27, 2014, No. 690, pp. 99-103.

*Primary Examiner* — Charles M Swift
(74) *Attorney, Agent, or Firm* — Conley Rose, P.C.

(57) ABSTRACT

An application management method, a terminal, a computer readable storage medium, and a computer program product including an instruction are disclosed. The method includes: suspending a background application when the background application meets a preset condition and disconnecting a communication link between the background application and a communications module when suspending the background application. Applicable to management of background applications on terminals, this method is intended to resolve a problem existing in the prior art that a battery life of the terminal is reduced when a large quantity of applications run in the background.

20 Claims, 6 Drawing Sheets

Suspend a background application if the background application meets a preset condition — 301

Disconnect a communication link between the background application and a communications module when suspending the background application — 302

(51) Int. Cl.
  *G06F 9/455* (2018.01)
  *G06F 9/46* (2006.01)
(52) U.S. Cl.
  CPC ............ *G06F 9/45558* (2013.01); *G06F 9/46* (2013.01); *G06F 9/461* (2013.01); *G06F 9/48* (2013.01); *G06F 9/485* (2013.01); *G06F 9/4843* (2013.01); *G06F 9/50* (2013.01); *G06F 9/5005* (2013.01); *G06F 9/5011* (2013.01); *G06F 9/5027* (2013.01); *G06F 9/5083* (2013.01); *G06F 9/5088* (2013.01)
(58) Field of Classification Search
  CPC .......... G06F 9/4843; G06F 9/485; G06F 9/50; G06F 9/5005; G06F 9/011; G06F 9/5022; G06F 9/5027; G06F 9/5083; G06F 9/5088
  See application file for complete search history.

(56) References Cited

U.S. PATENT DOCUMENTS

| | | | | |
|---|---|---|---|---|
| 2009/0292858 | A1* | 11/2009 | Lambeth | H04L 49/70 711/6 |
| 2009/0305732 | A1 | 12/2009 | Marcellino et al. | |
| 2010/0185882 | A1* | 7/2010 | Arnold | G06F 9/4893 713/320 |
| 2010/0322127 | A1 | 12/2010 | Nakajima | |
| 2011/0252429 | A1 | 10/2011 | Ballard et al. | |
| 2012/0210321 | A1* | 8/2012 | Silva | H04N 21/439 718/100 |
| 2012/0210326 | A1* | 8/2012 | Torr | H04N 21/439 718/103 |
| 2013/0205302 | A1 | 8/2013 | Nakagawa et al. | |
| 2013/0225145 | A1 | 8/2013 | Cherian et al. | |
| 2014/0245316 | A1* | 8/2014 | Archer | G06F 15/17318 718/104 |
| 2014/0313127 | A1 | 10/2014 | Deng | |
| 2015/0063212 | A1 | 3/2015 | Nirantar et al. | |
| 2015/0067688 | A1* | 3/2015 | Nagasawa | G06F 9/4881 718/102 |
| 2015/0160976 | A1* | 6/2015 | Kim | G06F 9/4881 718/108 |
| 2016/0196222 | A1* | 7/2016 | Shajit | G06F 9/5083 710/267 |
| 2016/0232022 | A1* | 8/2016 | Kania | G06F 9/4843 |
| 2017/0054640 | A1* | 2/2017 | Xue | H04L 1/00 |
| 2018/0042067 | A1 | 2/2018 | Nirantar et al. | |
| 2018/0157498 | A1* | 6/2018 | Borlick | G06F 11/106 |

FOREIGN PATENT DOCUMENTS

| | | |
|---|---|---|
| CN | 102981906 A | 3/2013 |
| CN | 104137630 A | 11/2014 |
| CN | 104317608 A | 1/2015 |
| CN | 105373405 A | 3/2016 |
| CN | 105468426 A | 4/2016 |
| CN | 105637919 A | 6/2016 |
| CN | 106055360 A | 10/2016 |
| CN | 106201683 A | 12/2016 |
| CN | 106648849 A | 5/2017 |
| CN | 107066320 A | 8/2017 |
| JP | 2011004195 | 1/2011 |
| JP | 2012038030 | 2/2012 |

* cited by examiner

APPLICATION MANAGEMENT METHOD AND TERMINAL

CROSS-REFERENCE TO RELATED APPLICATIONS

This application is a National Stage of International Patent Application No. PCT/CN2017/106199 filed on Oct. 13, 2017, which is hereby incorporated by reference in its entirety.

TECHNICAL FIELD

This application relates to the field of terminal technologies, and in particular to an application management method and a terminal.

BACKGROUND

Currently, increasing terminals such as mobile phones and tablet computers support a multitasking operating system. After the multitasking operating system is applied, the terminal can run a plurality of different application programs (Application, APP) at the same time. The application program can also be briefly referred to as an application. Applications that the terminal runs at the same time may include foreground applications and background applications. The foreground application refers to an application for which the terminal displays a user interface, indicating that a user is using the application. The background application refers to an application for which the terminal displays no user interface.

The background application, although having no user interface displayed, still occupies terminal resources and consumes power of the terminal. Therefore, when there is a large quantity of background applications on the terminal, the terminal is apt to freeze, and power consumption is comparatively high, resulting in a short battery life of the terminal.

SUMMARY

Embodiments of this application provide an application management method and a terminal, to resolve a problem existing in the prior art that a battery life of a terminal is reduced when a large quantity of applications run in the background.

To achieve the foregoing object, the embodiments of this application support the following technical solutions.

According to a first aspect, an application management method is provided. The method is applied to a terminal, where the terminal includes a communications module. The method includes:

suspending, by a terminal, a background application when the background application meets a preset suspension condition; and disconnecting, by the terminal, a communication link between the background application and the communications module when suspending the background application.

In the application management method provided in this embodiment of this application, the background application can be suspended when meeting the preset suspension condition, and the communication link between a suspended background application and the communications module can be disabled at the same time. This avoids that an application server reactivates the suspended background application through a network and keeps the application running in the background, thereby reducing power consumption of the terminal and prolonging a battery life of the terminal. In addition, disabling the communication link between the suspended background application and the communications module is simply disconnecting the suspended background application from the network. This does not affect use of the network by an unsuspended application, and therefore does not hinder a user from using the unsuspended application.

In a possible design method, the suspending, by a terminal, a background application when the background application meets a preset suspension condition includes:

suspending, by the terminal, the background application when the background application does not have any task being processed.

That the background application does not have any task being processed includes that all tasks of the background application have been processed; or the background application has a to-be-processed task and the to-be-processed task has not met a startup condition.

In this implementation, the startup condition includes a preset start time. Correspondingly, that the to-be-processed task has not met the startup condition includes that time has not reached the preset start time.

In this implementation, the startup condition includes a preset speed. Correspondingly, that the to-be-processed task has not met the startup condition includes that a speed of the terminal has not reached the preset speed.

It can be understood that, for a background application that has a startup condition, after the background application is suspended, the method further includes:

activating, by the terminal, the background application when the to-be-processed task meets the startup condition.

In a possible design method, that the background application meets a preset suspension condition includes that the background application does not have any preset task, where the preset task is a task that the terminal sets before the background application enters the background and that the terminal instructs the background application to continue to execute after the background application enters the background, and includes any one of the following tasks: obtaining sports data, positioning, and playing audio.

In a possible design method, disconnecting the communication link between the background application and the communication module includes:

disabling a preset network port of the background application, where the preset network port is used to establish the communication link between the background application and the communications module. Optionally, the preset network port may be a socket (Socket) port allocated by the terminal for the background application when the terminal supports the transmission control protocol (Transmission Control Protocol, TCP)/internet protocol (Internet Protocol, IP).

According to a second aspect, a terminal is provided. The terminal includes: a processing module and a communications module.

The processing module is configured to determine whether a background application meets a preset suspension condition; and if the background application meets the preset suspension condition, suspend the background application; and disconnect a communication link between the background application and the communications module when suspending the background application.

In a possible design method, the processing module is further configured to determine whether the background application has a task being processed.

The processing module is further configured to determine whether all tasks of the background application have been processed. Alternatively, the processing module is further configured to determine whether the background application has a to-be-processed task and whether the to-be-processed task meets a startup condition.

In this implementation, the startup condition includes a preset start time. Correspondingly, the processing module is further configured to determine whether time has reached the preset start time.

Alternatively, the startup condition includes a preset speed. Correspondingly, the processing module is further configured to determine whether a speed of the terminal has reached the preset speed.

It can be understood that, for a background application that has a to-be-processed task, the processing module is further configured to activate the background application when the to-be-processed task meets the startup condition.

In a possible design method, the processing module is further configured to determine whether the background application has a preset task. For example, the preset task is a task that the terminal sets before the background application enters the background and that the terminal instructs the background application to continue to execute after the background application enters the background, and includes any one of the following tasks: obtaining sports data, positioning, and playing audio.

In a possible design method, the processing module is further configured to disable a preset network port of the background application, where the preset network port is configured to establish the communication link between the background application and the communications module. The preset network port may be a socket port allocated by the terminal for the background application when the terminal supports the TCP/IP protocol.

According to a third aspect, a terminal is provided. The terminal includes a processor, a communications interface, and a memory, where the memory is configured to store a computer executable instruction, the processor and the memory are connected through the bus, and when the terminal runs, the processor executes the computer executable instruction stored in the memory, to enable the terminal to execute:

determining whether a background application meets a preset suspension condition;

suspending the background application if the background application meets the preset suspension condition; and disconnecting a communication link between the background application and the communications interface, when suspending the background application.

In a possible design method, the processor is further configured to determine whether the background application has a task being processed.

The processor is further configured to determine whether all tasks of the background application have been processed. Alternatively, the processor is further configured to determine whether the background application has a to-be-processed task and whether the to-be-processed task meets a startup condition.

In this implementation, the startup condition includes a preset start time. Correspondingly, the processor is further configured to determine whether time has reached a preset start time.

Alternatively, the startup condition includes a preset speed. Correspondingly, the processor is further configured to determine whether a speed of the terminal has reached the preset speed.

It can be understood that, for a background application that has a to-be-processed task, the processor is further configured to activate the background application when the to-be-processed task meets the startup condition.

In a possible design method, the processor is further configured to determine whether the background application has a preset task. For example, the preset task is a task that the terminal sets before the background application enters the background and that the terminal instructs the background application to continue to execute after the background application enters the background, and includes any one of the following tasks: obtaining sports data, positioning, and playing audio.

In a possible design method, the processor is further configured to disable a preset network port of the background application. The preset network port may be a socket port allocated by the terminal for the background application when the terminal supports the TCP/IP protocol.

According to a fourth aspect, a computer readable storage medium is provided, where the computer readable storage medium stores an instruction. When the instruction is run on a terminal, the terminal is enabled to execute the application management method according to the first aspect.

According to a fifth aspect, an embodiment of this application provides a computer program product including an instruction. When the computer program product is run on a terminal, the terminal is enabled to execute the application management method according to the first aspect.

In the embodiments of this application, names of unit modules of the terminal do not constitute any limitation on the device. In actual implementation, these unit modules may come in other names. Functions of the unit modules fall within the scope defined by the claims of this application and equivalent technologies thereof, provided that functions of the unit modules are similar to those in the embodiments of this application.

DESCRIPTION OF EMBODIMENTS

The terms "first" and "second" below are merely intended for a purpose of description, and shall not be understood as any indication or implication of relative importance or any implicit indication of a quantity of indicated technical features. Therefore, a feature modified by "first" or "second" may include one or more such features, explicitly or implicitly. In the description of the embodiments of this application, unless otherwise stated, "a plurality" means two or more than two.

In the prior art, a Doze mechanism for application management is proposed to reduce power consumption of a terminal. In the Doze mechanism, a terminal has five states, which are respectively ACTIVE, INACTIVE, IDLE_PENDING, IDLE, and IDLE_MAINTENANCE. The following specifically explains how the terminal transits between these five states.

Figure 1:
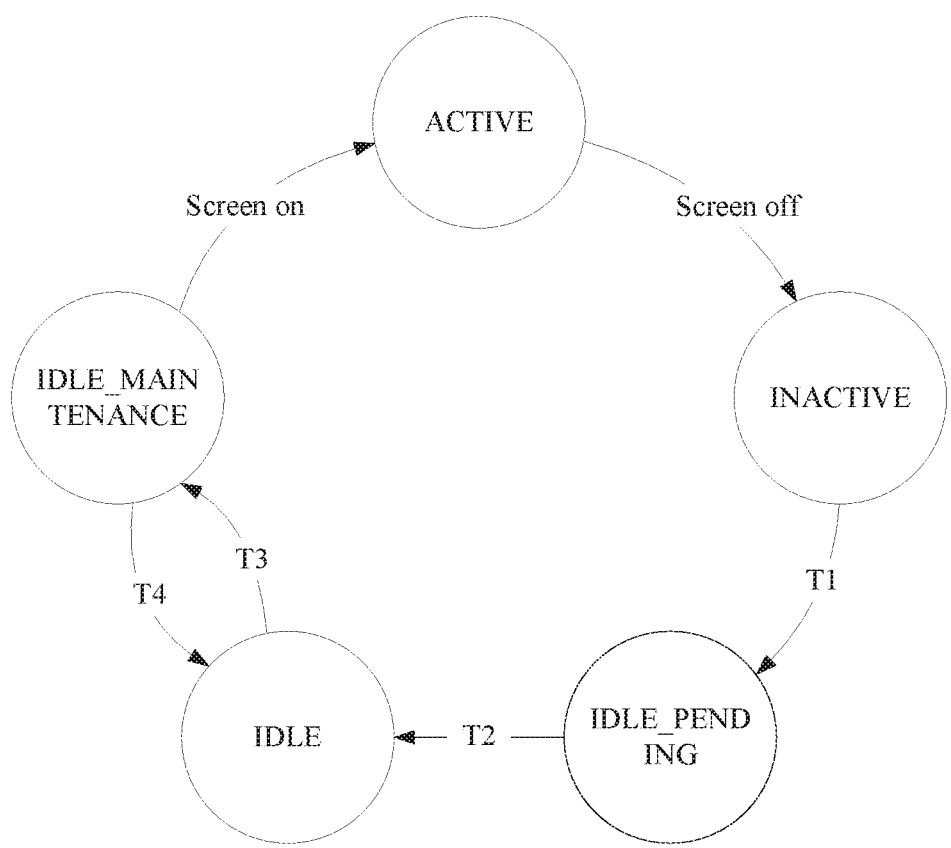
FIG. 1 is a schematic diagram of state transition of a terminal using a Doze mechanism.

As shown in FIG. 1, when the terminal is in use or connected to a power source for charging, the terminal is in the ACTIVE state. When the terminal is screen off and not charging, the terminal transits from the ACTIVE state to the INACTIVE state. If the terminal is not activated within a first set time T1 (for example, 30 minutes), the terminal transits from the INACTIVE state to the IDLE_PENDING state. If the terminal is not activated within a second set time T2 (for example, 1 minute), the terminal transits from the IDLE_PENDING state to the IDLE state.

When the terminal is in the IDLE state, the terminal controls background applications by, for example, preventing a non-whitelisted background application from connecting to a network, disabling a wake lock (Wake Lock) function, and suspending a task of the background application, so as to reduce power consumption of the terminal. The suspending a task of the background application includes saving a status and processed data of the task, suspending a process processing the task, and releasing resources allocated for the task.

In addition, when the terminal is in the IDLE state for more than a third set time T3 (for example, 30 minutes), the terminal transits to the IDLE_MAINTENANCE state. The terminal stays in the IDLE_MAINTENANCE state for a fourth set time T4 (for example, 30 seconds), so that the terminal can implement routine processing on the background applications. For example, the terminal allows the background application to use a network and process a suspended task. Then, the terminal transits from the IDLE_MAINTENANCE state back to the IDLE state.

Of course, when the terminal is screen on again, the terminal transits directly to the ACTIVE state regardless of whether the terminal is in the INACTIVE state, the IDLE_PENDING state, the IDLE state, or the IDLE_MAINTENANCE state.

In the foregoing Doze mechanism, the terminal can effectively manage the background applications to reduce power consumption of the terminal, only when the terminal is in the IDLE state. However, when the terminal is in the three transitional states which are INACTIVE, IDLE_PENDING, and IDLE_MAINTENANCE, the background applications are still running and therefore continue to consume power, leading to unnecessary power consumption.

When the terminal is in these three transitional states, the terminal allows the background applications to use a network. This helps an application server to activate a background application through the network and even keep the background application miming in the background. Consequently, efforts of the terminal to control power consumption through the Doze mechanism are undermined, and power consumption of the terminal stays relatively high, reducing a battery life of the terminal.

To reduce power consumption of the terminal, the embodiments of this application provide an application management method. After determining that at least one background application meets a given condition, the terminal directly suspends the background application and disables a communication link between the background application and a communications module. Therefore, the background application cannot be activated by an application server, reducing power consumption of the terminal and prolonging a battery life of the terminal. The application management method may be applied to any terminal such as a mobile phone, a wearable device, an augmented reality (Augmented Reality, AR)/virtual reality (Virtual Reality, VR) device, a tablet computer, a laptop computer, an ultra-mobile personal computer (Ultra-Mobile Personal Computer, UMPC), a netbook, or a personal digital assistant (Personal Digital Assistant, PDA). In the following embodiments, a specific form of the terminal is not limited in any way.

Figure 2:
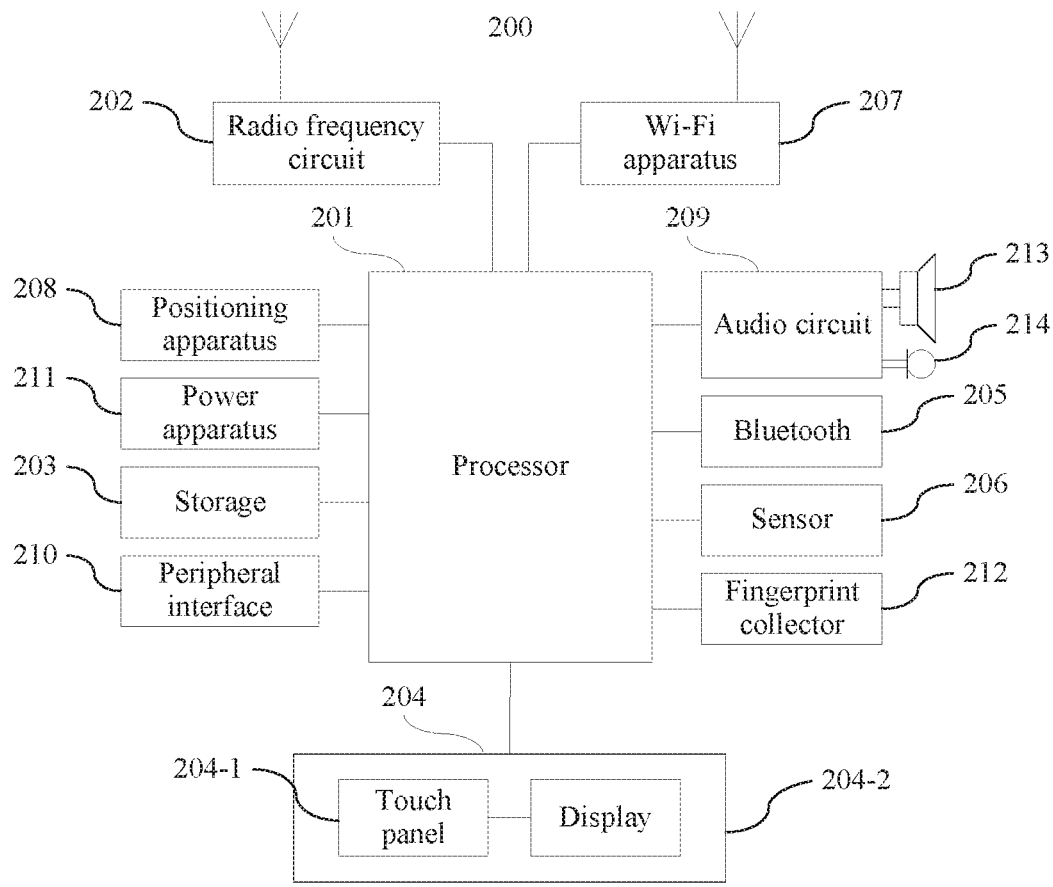
FIG. 2 is a schematic structural diagram of a terminal according to an embodiment of this application.

As shown in FIG. 2, the terminal in the embodiments of this application may be a mobile phone 200. The following uses the mobile phone 200 as an example to specifically describe the embodiments. It should be understood that the illustrated mobile phone 200 is only one example of the foregoing terminal, and the mobile phone 200 may have more or fewer components than those shown in the figure, have two or more components combined, or have different component configurations.

As shown in FIG. 2, the mobile phone 200 may specifically include components such as a processor 201, a radio frequency (Radio Frequency, RF) circuit 202, a memory 203, a touchscreen 204, a Bluetooth apparatus 205, one or more sensors 206, a wireless fidelity (Wireless Fidelity, Wi-Fi) apparatus 207, a positioning apparatus 208, an audio circuit 209, a peripheral interface 220, and a power system 211. These components can communicate with each other through one or more communications buses or signal lines (not shown in FIG. 2). A person skilled in the art can understand that the hardware structure shown in FIG. 2 does not constitute any limitation on the mobile phone. The mobile phone 200 may include more or fewer components than those shown in FIG. 2, or have some components combined, or have different component arrangements.

The components of the mobile phone 200 are specifically described below with reference to FIG. 2.

The processor 201 is a control center of the mobile phone 200, connecting various parts of the mobile phone 200 by using various interfaces and lines, and executing various functions and processes data of the mobile phone 200 by running or executing applications stored in the memory 203 and calling data stored in the memory 203. In some embodiments, the processor 201 may include one or more processing units. For example, the processor 201 may be a Kirin 960 chip manufactured by Huawei Technologies Co., Ltd. In some embodiments of this application, the processor 201 may further include a fingerprint verification chip for verification of a collected fingerprint.

The radio frequency circuit 202 may be configured to send or receive a radio signal during information transmission or reception or during a call. In particular, after receiving downlink data from a base station, the radio frequency circuit 202 may send the data to the processor 201 for processing, and in addition, may send uplink-related data to the base station. Typically, the radio frequency circuit includes but is not limited to an antenna, at least one amplifier, a transceiver, a coupler, a low noise amplifier, a duplexer, and the like. In addition, the radio frequency circuit 202 may communicate with another device through wireless communication. The wireless communication may use any wireless communication standard or protocol, including but not limited to the global system for mobile communications, general packet radio service, code division multiple access, wideband code division multiple access, long term evolution, email, short message service, and the like.

The memory 203 is configured to store applications and data, and the processor 201 executes various functions of the mobile phone 200 and processes data by running the applications and data stored in the memory 203. The memory 203 mainly includes a program storage area and a data storage area. The program storage area may store an operating system, and an application required by at least one function (such as an audio playback function and an image playback function). The data storage area may store data (such as audio data and a phone book) created based on use of the mobile phone 200. In addition, the memory 203 may include a high speed random access memory (Random Access Memory, RAM), and may further include a nonvolatile memory such as a magnetic disk storage device, a flash memory device, or another volatile solid-state storage device. The memory 203 may store various operating systems, such as an iOS® operating system developed by Apple, and an Android® operating system developed by Google. The memory 203 may stand alone and be connected to the processor 201 through the communications bus. Alternatively, the memory 203 may be integrated with the processor 201.

The touchscreen 204 may specifically include a touch panel 204-1 and a display 204-2.

The touch panel 204-1 may collect a touch operation on or near the touch panel 204-1 performed by a user of the mobile phone 200 (for example, an operation performed by the user on or near the touch panel 204-1 by using any applicable object, for example, a finger or a stylus), and send the collected touch information to another device (for example, the processor 201). The touch operation near the touch panel 204-1 by the user may be called a hover touch. The hover touch may mean that the user is not required to directly touch the touch panel to select, move or drag a target (for example, a control) but only required to stay near the terminal to perform an intended function. In addition, the touch panel 204-1 may be implemented in various types, such as a resistive type, a capacitive type, an infrared type, and a surface acoustic wave type.

The display (also known as a display screen) 204-2 may be configured to display information input by a user or information provided to the user, and various menus of the mobile phone 200. The display 204-2 may be configured in a form of a liquid crystal display, an organic light emitting diode screen, or the like. The touch panel 204-1 may cover the display 204-2. After detecting a touch event on or near the touch panel 204-1, the touch panel 204-1 sends the touch event to the processor 201 to determine a type of the touch event, and then the processor 201 can provide corresponding visual output on the display 204-2 based on the type of the touch event. In FIG. 2, the touch panel 204-1 and the display screen 204-2 are used as two standalone components to implement input and output functions of the mobile phone 200. However, in some embodiments, the touch panel 204-1 and the display screen 204-2 may be integrated to implement the input and output functions of the mobile phone 200. It can be understood that the touchscreen 204 is formed by stacking a plurality of layers of materials. In the embodiments of this application, only the touch panel (layer) and the display screen (layer) are shown. Other layers are not described in this embodiment of this application. In addition, the touch panel 204-1 may be configured on the front of the mobile phone 200 in a form of a full panel, and the display screen 204-2 may also be configured on the front of the mobile phone 200 in the form of a full panel, so that a bezel-free structure can be implemented on the front of the mobile phone.

In addition, the mobile phone 200 may further have a fingerprint recognition function. For example, a fingerprint reader 212 may be configured on the back of the mobile phone 200 (for example, below a rear camera) or configured on the front of the mobile phone 200 (for example, below the touchscreen 204). For another example, a fingerprint collector 212 may be configured in the touchscreen 204 to implement the fingerprint recognition function, That is, the fingerprint collector 212 may be integrated with the touchscreen 204 to implement the fingerprint recognition function of the mobile phone 200. In this case, the fingerprint collector 212 is configured in the touchscreen 204 as a part of the touchscreen 204 or may be configured in the touchscreen 204 in another manner. In the embodiments of this application, a main component of the fingerprint collector 212 is a fingerprint sensor. The fingerprint sensor may use any type of sensing technology including but not limited to an optical technology, a capacitive technology, a piezoelectric technology, an ultrasonic technology, or the like.

The mobile phone 200 may further include the bluetooth apparatus 205, which is configured to realize data exchange between the mobile phone 200 and another short-range terminal (for example, a mobile phone or a smart watch). In the embodiments of this application, the bluetooth apparatus may be an integrated circuit, a bluetooth chip, or the like.

The mobile phone 200 may further include at least one type of sensor 206, such as a light sensor, a motion sensor, and other sensors. Specifically, the light sensor may include an ambient light sensor and a proximity sensor. The ambient light sensor may adjust luminance of the display of the touchscreen 204 depending on brightness of ambient light, and the proximity sensor may turn off the display when the mobile phone 200 moves to an ear. As a type of motion sensor, an accelerometer sensor may detect magnitudes of accelerations in various directions (typically three axes), and detect a magnitude and a direction of gravity in a still state, and may be applied to mobile phone posture recognition applications (such as landscape/portrait switching, related gaming, and magnetometer posture calibration), and vibration recognition-related functions (such as a pedometer or knock recognition), and the like. For other sensors such as a gyroscope, a barometer, a hygrometer, a thermometer, and an infrared sensor that can also be configured in the mobile phone 200, details are not described herein.

The Wi-Fi apparatus 207 is configured to provide the mobile phone 200 with network access that complies with a Wi-Fi related standard protocol. The mobile phone 200 can access a Wi-Fi access point by using the Wi-Fi apparatus 207 to assist the user in sending or receiving emails, browsing web pages, visiting streaming media, and the like. The Wi-Fi apparatus 207 provides the user with wireless broadband internet access. In some other embodiments, the Wi-Fi apparatus 207 may also function as a Wi-Fi wireless access point to provide Wi-Fi network access for another terminal.

The positioning apparatus 208 is configured to provide a geographic location for the mobile phone 200. It can be understood that the positioning apparatus 208 may specifically be a receiver of a positioning system such as the global positioning system (Global Positioning System, GPS), the Beidou satellite navigation system, or Russia's GLONASS. After receiving a geographical location sent by the positioning system mentioned above, the positioning apparatus 208 sends the information to the processor 201 for processing, or sends the information to the memory 203 for storage. In some other embodiments, the positioning apparatus 208 may alternatively be a receiver of an assisted global positioning system (Assisted Global Positioning System, AGPS). The AGPS system acts as assisting server to assist the positioning apparatus 208 in performing range measurement and positioning services. In this case, the assisting positioning server communicates with the positioning apparatus 208 (which is a GPS receiver) of the terminal, for example, the mobile phone 200, through a wireless communications network, to provide positioning assistance. In some other embodiments, the positioning apparatus 208 may alternatively be a positioning technique based on a Wi-Fi access point. Because each Wi-Fi access point has a globally unique media access control (Media Access Control, MAC) address, the terminal, with Wi-Fi enabled, can scan and collect broadcast signals of surrounding Wi-Fi access points, to obtain MAC addresses broadcast by these Wi-Fi access points. The terminal sends the data (such as the MAC addresses) that can identify the Wi-Fi access points to a location server through a wireless communications network. The location server retrieves a geographic location of each Wi-Fi access point, and calculates a geographic location of the terminal based on strength of Wi-Fi broadcast signals and sends the calculated geographic location to the positioning apparatus 208 of the terminal.

The audio circuit 209, a speaker 213, and a microphone 214 may provide an audio interface between the user and the mobile phone 200. The audio circuit 209 may transmit an electrical signal, converted from received audio data, to the speaker 213, and the speaker 213 converts the electrical signal into an audio signal for output. In the other way, the microphone 214 converts a captured audio signal into an electrical signal, and the audio circuit 209 receives electrical signal and converts it into audio data, and then outputs the audio data to the RF circuit 202 so that the audio data can be sent to another mobile phone, or the audio data is output to the memory 203 to facilitate further processing.

The peripheral interface 220 is configured to provide various interfaces for external input/output devices (such as a keyboard, a mouse, an external display, an external memory, and a subscriber identification module card). For example, a mouse is connected using a universal serial bus (Universal Serial Bus, USB) interface, and a subscriber identification module (Subscriber Identification Module, SIM) card provided by a telecommunication operator is connected through a metal contact on a subscriber identification module card slot. The peripheral interface 220 may be configured to couple the foregoing external input/output peripherals to the processor 201 and the memory 203.

The mobile phone 200 may further include a power apparatus 211 (for example, a battery and a power management chip) that supplies power to the various components. The battery may be logically connected to the processor 201 by the power management chip, so as to implement functions such as charge management, discharge management, and power consumption management by using the power apparatus 211.

Although not shown in FIG. 2, the mobile phone 200 may further include a camera (a front camera and/or a rear camera), a flash, a micro projection apparatus, a near field communication (Near Field Communication, NFC) apparatus, and the like. Details are not described herein.

To clearly describe the application management method provided in the embodiments of this application, some concepts that may appear in the following embodiments are first introduced below.

An application refers to an application program installed on the foregoing terminal for performing at least one function. Such applications include, for example, a camera application for taking photos and videos, a map application for positioning and navigation, a player application for playing audio and video files, an instant messaging application for social communication, a browser application for browsing web pages, a download application for downloading web files, and a payment application for online shopping and money transfer.

Suspending an application, also known as freezing an application, means pausing running of the application, saving data and a status of the application, and releasing software and hardware resources allocated for the application. The releasing hardware and software resources allocated for the application may include releasing a computing resource, an internal cache resource, and other necessary hardware resources allocated for the application. For example, suspending an online video player may include saving a URL, a name, a playback progress of a video file being played, releasing a processor resource and an internal cache resource allocated for the online video player, and releasing a speaker and a display screen.

Activating an application means starting a suspended application, and may specifically include: reading data and a status of the application that are saved when the application is suspended, reallocating necessary software and hardware resources to the application according to the data and the status of the application, and enabling a preset network port of the application, and so on.

The application management method provided in the embodiments of this application may be applied to a terminal that includes a communications module, where the communications module is typically configured for the terminal to communicate with other devices. Using the mobile phone 200 shown in FIG. 2 as an example, the communications module may include at least one of the radio frequency circuit 202 and the Wi-Fi apparatus 207.

Figure 3:
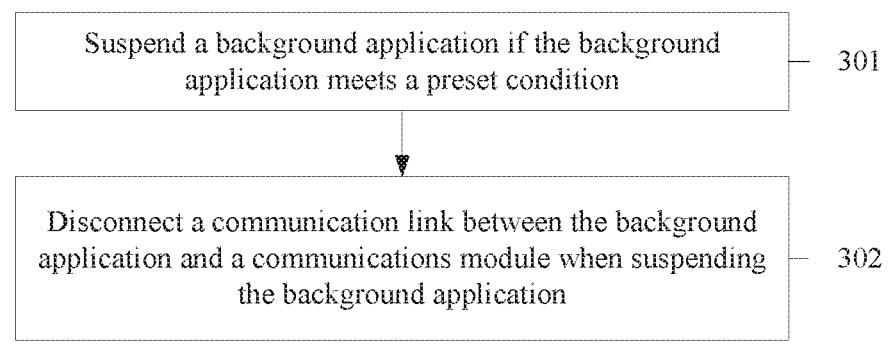
FIG. 3 is a schematic flowchart of an application management method according to an embodiment of this application.

As shown in FIG. 3, the application management method includes the following steps.

301. Suspend a background application if the background application meets a preset suspension condition.

In a possible implementation, that the background application meets a preset suspension condition includes that the background application does not have any task being processed.

Optionally, that the background application does not have any task being processed includes that all tasks of the background application have been processed.

For example, when an online video file is being played using a player application, a video file that is the same as or different from the video file being played can be downloaded. The playback task and the download task are completed before the player application enters the background. Therefore, the player application can be considered as a background application that meets the preset suspension condition.

Optionally, that the background application does not have any task being processed includes that the background application has a to-be-processed task and the task has not met a startup condition.

For example, the startup condition includes a preset start time, and that the to-be-processed task has not met a startup condition includes that time has not reached the preset start time.

For example, the user sets a ticket-snatching task at 9:00 am on Dec. 14, 2017 using com.yipiao, a train ticket booking application, where the ticket-snatching task is for a journey from Beijing to Shanghai on Feb. 14, 2018 (the day before New Year's Eve). It is assumed that the ticket is not available until 12:00 Dec. 14, 2017, and it is unnecessary to run com.yipiao during the period from 9:00 to 12:00 on Dec. 14, 2017. Therefore, com.yipiao can be suspended during the period when time (which may be obtained by reading an internal clock of the terminal) has not reached a preset start time (for example, when the ticket is available). A given time advance may be defined in setting of a startup condition. For example, the start time may be set to 11:55.

For example, the startup condition includes a preset speed, and that the to-be-processed task has not met a startup condition includes that a speed of the terminal has not reached the preset speed.

For example, an adult typically walks at a speed less than 6 km/h and runs at a speed of 8 km/h to 10 km/h. Therefore, when a preset speed of a sports application is set to 8 km/h to 10 km/h, if the terminal detects that its moving speed is less than 8 km/h, it can be considered that the sports application has not met a startup condition.

It should be noted that whether the to-be-processed task meets the startup condition may be automatically detected and determined by the terminal system, or may be detected and determined by the terminal according to a user setting.

Figure 4A:
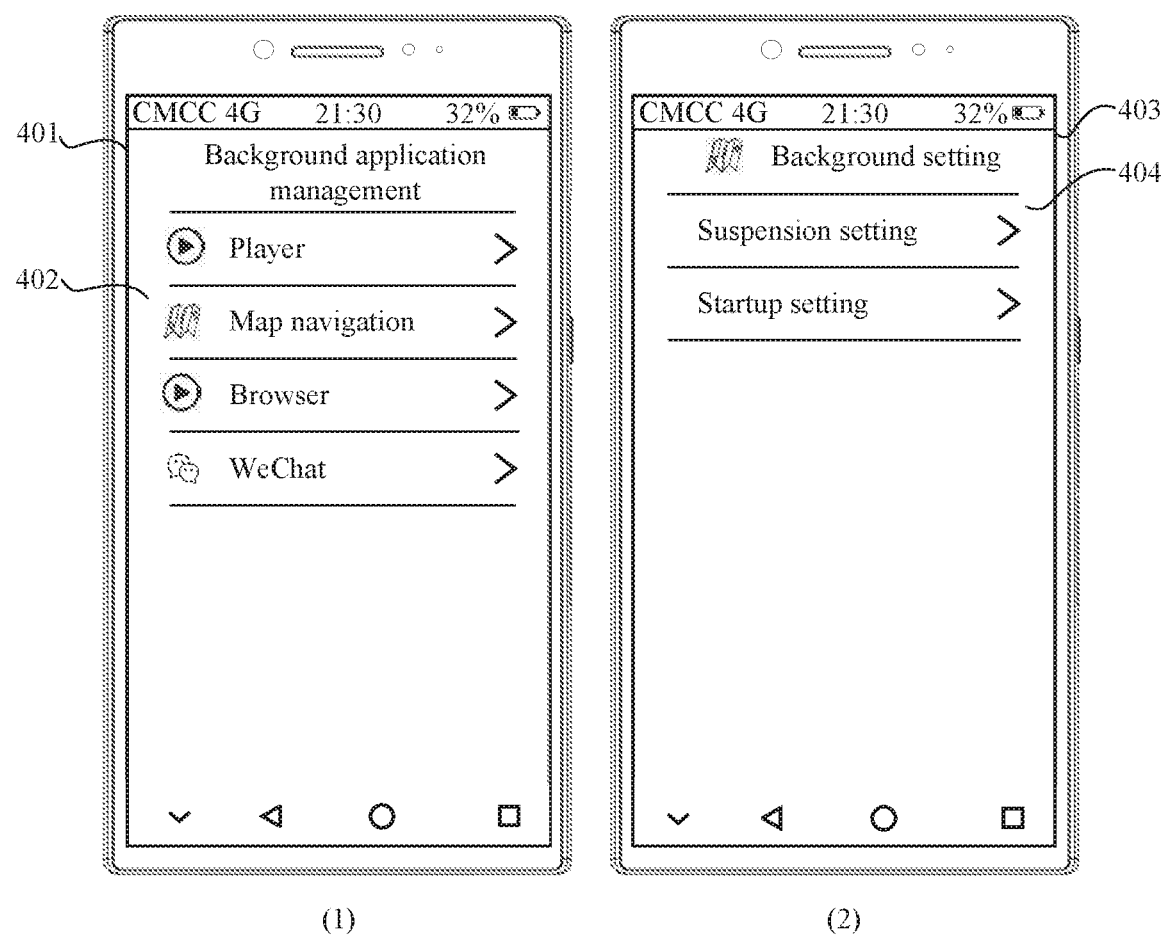
FIG. 4A is a schematic diagram of a user interface for background application management according to an embodiment of this application.
Figure 4B:
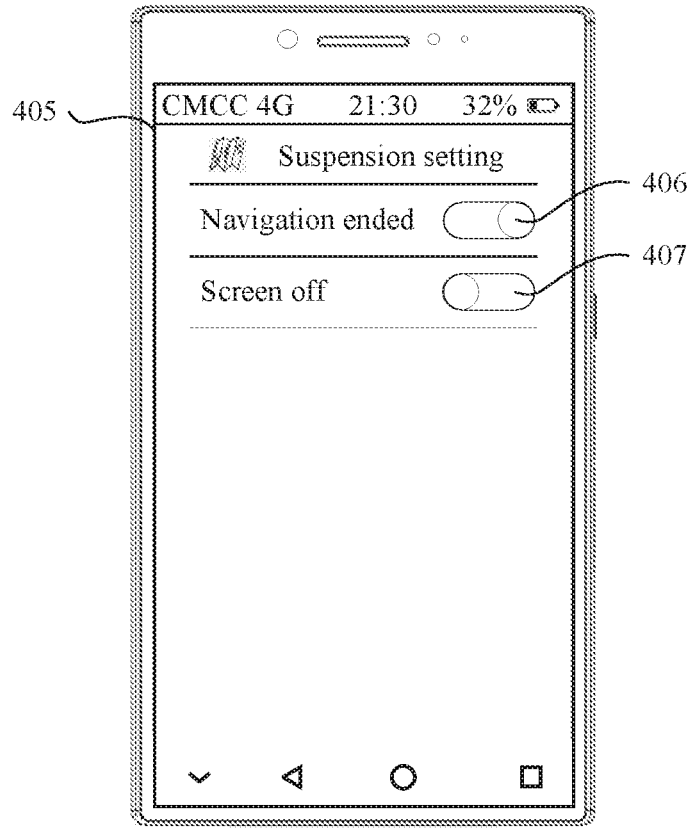
FIG. 4B is a schematic diagram of a user interface for suspension setting of a map navigation application according to an embodiment of this application.

For example, refer to a graphical user interface (Graphical User Interface, GUI) shown in FIG. 4A and FIG. 4B. When the user taps a map navigation button 402 on a background application management page 401 shown in diagram (1) of FIG. 4A, a background setting page 403 shown in diagram (2) of FIG. 4B is displayed. Then, when the user taps a suspension setting button 404 on the page 403, a suspension setting page 405 shown in FIG. 4B is displayed. On the suspension setting page 405, the user may set at least one suspension condition using two options: navigation ended 406 and screen off 407. For example, as shown in FIG. 4B, the user enables navigation ended 406 without enabling screen off 407. When all or some of the suspension conditions set above are met, the terminal automatically suspends the map navigation application.

Optionally, that the background application meets a preset suspension condition further includes that the background application does not have any preset task, where the preset task is a task that the terminal sets before the background application enters the background and that the terminal instructs the background application to continue to execute after the background application enters the background, and includes any one of the following tasks: obtaining sports data, positioning, and playing audio.

The foregoing preset task may be flexibly set based on an actual need of the user and a task type of the application.

Optionally, after the application enters the background, a task that the user can still perceive may be set as the preset task. For example, when the user is listening to a radio broadcast or listening to music, even if an audio playback application has entered the background, the user still needs the audio playback application to keep running. Of course, some specific tasks are not user perceivable, but can still be set as preset tasks. For example, applications running in the background include a sports application. When the user is doing sports, even if the user cannot perceive the sports application, the user still needs to obtain sports data such as a sports trail, a sports speed, sports duration, and a sports range by using the sports application. When background applications are still running the above preset tasks, it is considered that these background applications do not meet the preset suspension condition, and do not need to be suspended.

It should be noted that, although some background applications are still running tasks, these tasks are not preset tasks. Such tasks include, for example, a download task. When background applications are not running any preset task, it is considered that these background applications meet the preset suspension condition, and need to be suspended.

Suspending a background application includes storing a status and data of the background application and releasing resources that are no longer used by the background application. For example, when an online video file is being played using a player application, the terminal needs to allocate necessary resources such as a processor resource, a storage resource, a speaker and a display screen to the player application. When the player application meets the preset suspension condition and becomes suspended, the terminal stores configuration information of the player application as well as information such as a web address, a file name, and a playback progress of the online video file being played, and releases resources no longer used such as the processor resource, the speaker, and the display screen.

402. Disconnect a communication link between the background application and the communications module when suspending the background application.

In actual application, different communications technology standards supported by the terminal lead to different communication links between the background application and the communications module. Specifically, preset network ports allocated by the terminal for a background application are different.

Figure 3A:
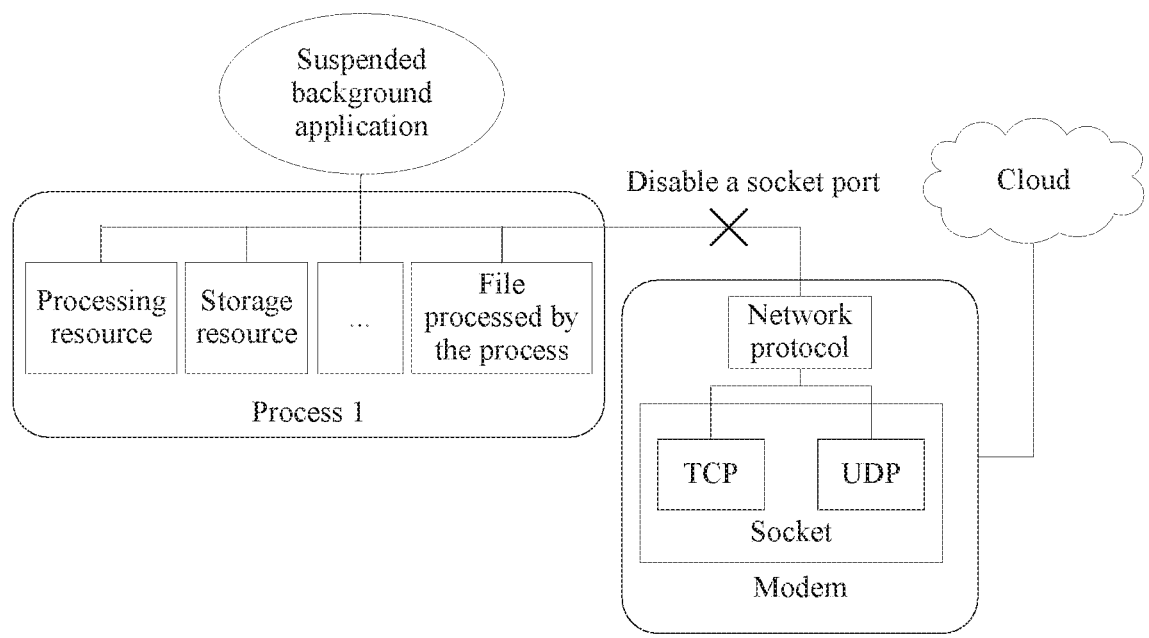
FIG. 3A is a schematic diagram of disabling a socket port allocated for a background application according to an embodiment of this application.

For example, as shown in FIG. 3A, it is assumed that the terminal creates a process 1 for the suspended background application, allocates resources such as a processing resource and a storage resource for the process 1, and specifies a file for processing by the process 1. The process 1 is connected to another device or a network through a socket (Socket) port that is located inside a modem and allocated by the terminal. The modem can support at least one network protocol of the TCP/IP protocol, the user datagram protocol (User Datagram Protocol, UDP), and the like. When suspending the process 1 of the suspended background application, the terminal disables the socket allocated by the terminal for the suspended background application, so as to disconnect the suspended background application from the network. In this way, it is avoided that an application server activates the suspended background application through the socket port allocated by the terminal for the suspended background application, thereby reducing power consumption of the terminal.

It should be noted that, unlike the prior art, step 401 and step 402 in this embodiment of this application are completed by an Android system layer.

In the application management method provided in this embodiment of this application, the background application can be suspended when meeting the preset suspension condition, and the communication link between the suspended background application and the communications module can be disabled at the same time. This avoids that an application server reactivates the suspended background application through a network and keeps the application running in the background, thereby reducing power consumption of the terminal and prolonging a battery life of the terminal. In addition, disabling the communication link between the suspended background application and the communications module is simply disconnecting the suspended background application from the network. This does not affect use of the network by an unsuspended application, and therefore does not hinder a user from using the unsuspended application.

In the application management method provided in this embodiment of this application, control is specific to an application. Specifically, when a process is frozen at the application side without being killed, the modem side network link is forcibly shut down to reduce power consumption of the terminal. It should be noted that what is disabled is only the socket port for the application but not the entire modem. Therefore, normal use of the network by another application is not affected. In this way, power consumption of the terminal is highly accurately controlled. Especially for non-user-perceivable background applications, such control is more effective, with essentially 0 power consumption.

Figure 5:
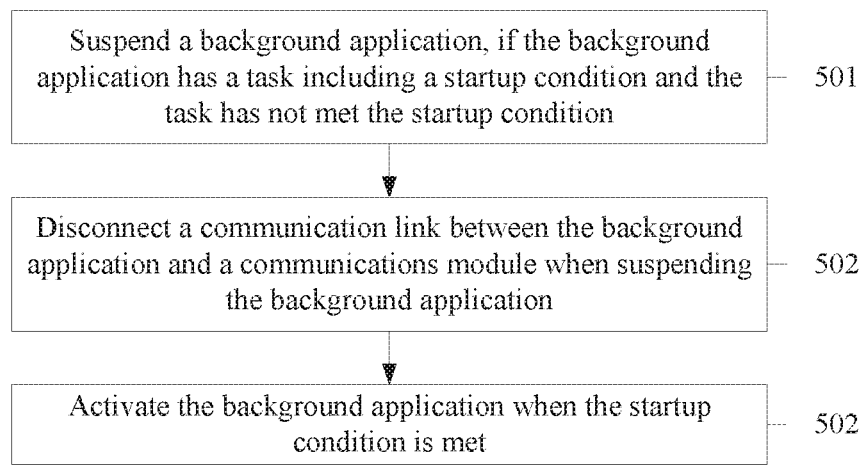
FIG. 5 is a schematic flowchart of another application management method according to an embodiment of this application.

As shown in FIG. 5, for a background application that has a to-be-processed task, step 301 may specifically be implemented as step 501.

501. Suspend a background application, if the background application has a to-be-processed task and the to-be-processed task has not met a startup condition.

For the startup condition, refer to the related description in the foregoing step 301, and details are not described herein again.

And, after step 302, step 502 may be performed further.

502. Activate the background application when the startup condition is met.

For a method for activating the background application, refer to the related description in the foregoing step 301, and details are not described herein again.

In the embodiments of this application, functional modules may be planned based on the foregoing method examples. For example, functional modules may be planned in correspondence to functions, or two or more functions may be integrated into one processing module. The integrated module may be implemented in a form of hardware or in a form of a software functional module. It should be noted that, the module division in the embodiments of this application is illustrative and merely logical function division. In actual implementation, another division manner may be used.

Figure 6:
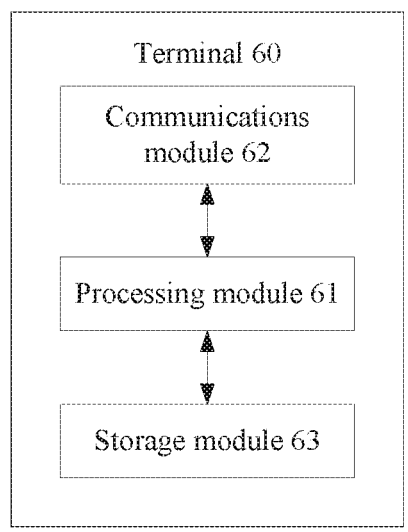
FIG. 6 is a schematic structural diagram of a terminal according to an embodiment of this application.

FIG. 6 shows a possible schematic structural diagram of the terminal in the foregoing embodiments. As shown in FIG. 6, a terminal 60 includes: a processing module 61 and a communications module 62. The processing module 61 is configured to control and manage actions of the terminal. For example, the processing module 61 is configured to support the terminal in performing step 301 and step 302 in FIG. 3, and/or is configured to perform other steps of the technical solutions described in this specification. The communications module 62 is configured to support communication between the terminal and another device or a network. For example, the communications module 62 supports communication between an application on the terminal and an application server corresponding to the application. In addition, the terminal 60 further includes a storage module 63, configured to store a related instruction and related data.

All related content of the steps in the foregoing method embodiments may be incorporated into the function descriptions of the corresponding functional modules shown in FIG. 6 by reference. Details are not described herein again.

Figure 7:
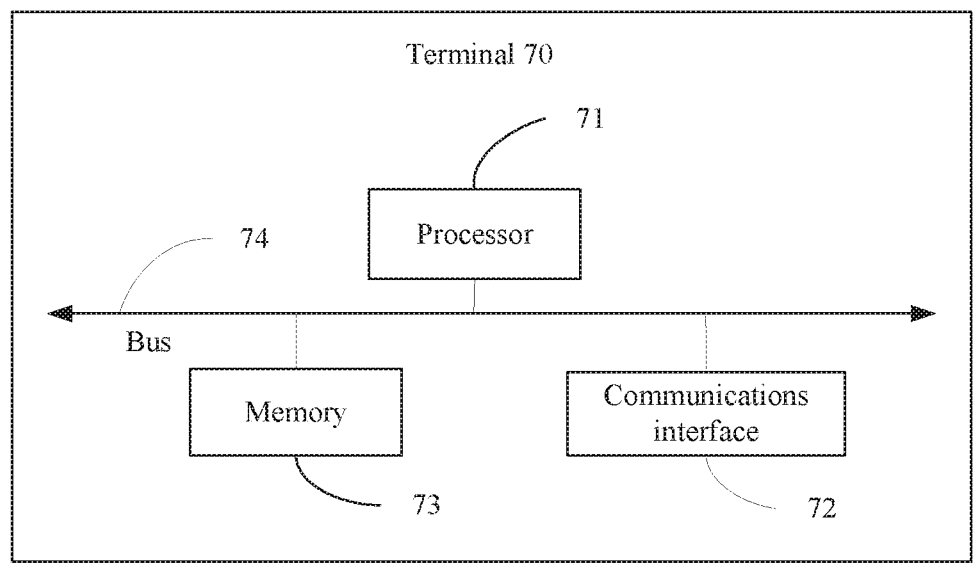
FIG. 7 is a schematic structural diagram of another terminal according to an embodiment of this application.

When the processing module is implemented by a processor, the communications module is implemented by a communications interface, and the storage module is implemented by a memory. FIG. 7 shows another possible schematic structural diagram of the terminal in the foregoing embodiment. As shown in FIG. 7, a terminal 70 includes a processor 71, a communications interface 72, and a memory 73. The processor 71, the communications interface 72, and the memory 73 communicate with each other through a bus 74. The processor 71 is configured to control and manage actions of the terminal. For example, the processor 71 may be configured to support the terminal in performing step 301 and step 302 in FIG. 3, and/or is configured to perform other steps of the technical solutions described in this specification. The communications interface 72 is configured to support communication between the terminal and an external device. For example, the communications interface 72 supports communication between an application on the terminal and an application server corresponding to the application. The memory 73 is configured to store an instruction and data.

The processor 71 may be the processor 201 shown in FIG. 2. The communications interface 72 may include at least one of the radio frequency circuit 202 and the Wi-Fi apparatus 207 shown in FIG. 2. The memory 73 may be the memory 203 shown in FIG. 2. In addition, the terminal 70 may further include the sensor 206, the positioning apparatus 208, the audio circuit 209, the peripheral interface 210, and the like shown in FIG. 2.

All or some of the foregoing embodiments may be implemented using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a terminal, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, a computer, a server, or a data center to another website, another computer, another server, or another data center in a wired (for example, through a coaxial cable, an optical fiber, or a digital subscriber line (DSL)) or wireless (for example, through infrared ray, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk Solid State Disk (SSD)), or the like.

The foregoing descriptions are merely specific implementations of this application, but are not intended to limit the protection scope of this application. Any variation or replacement readily figured out by a person skilled in the art within the technical scope disclosed in application shall fall within the protection scope of application. Therefore, the protection scope of this application shall be subject to the protection scope of the claims.

What is claimed is:

1. An application management method, implemented by a terminal, wherein the terminal comprises a communications interface and an operating system, and wherein the application management method comprises:
   suspending a background application on the terminal when the background application meets a preset suspension condition by:
   pausing the background application from running; and
   releasing software and hardware resources allocated for the background application;
   suspending the background application on the terminal when the background application has a to-be-processed task that has not met a startup condition wherein the startup condition comprises a preset speed, and wherein the to-be-processed task has not met the startup condition when a speed of the terminal has not reached the preset speed; and
   disconnecting a communication link between the background application and the communications interface, wherein the communications interface is implemented by a radio communications circuit of the terminal, wherein the operating system disconnects the communication link by disabling a preset network port associated with and located inside the radio communications circuit, and wherein the preset network port in the radio communications circuit establishes the communication link between the background application and the communications interface.

2. The application management method of claim 1, further comprising suspending the background application when the background application does not have any tasks being processed.

3. The application management method of claim 2, wherein the background application does not have any tasks being processed when all of the tasks of the background application have been processed.

4. The application management method of claim 3, wherein the startup condition comprises a preset start time, wherein the to-be-processed task has not met the startup condition when a time of the terminal has not reached the preset start time.

5. The application management method of claim 3, further comprising activating the background application when the to-be-processed task meets the startup condition.

6. The application management method of claim 1, wherein the background application meets a preset suspension condition when the background application does not have a preset task, wherein the preset task is set by the terminal before the background application enters the background, and wherein the terminal instructs the background application to continue to execute the preset task after the background application enters the background.

7. The application management method of claim 1, wherein the preset network port comprises a socket port allocated by the terminal for the background application when the terminal supports Transmission Control Protocol/Internet Protocol (TCP/IP).

8. A terminal, comprising:
   a communications interface;
   a processor coupled to the communications interface; and
   a memory coupled to the processor and storing instructions that, when executed by the processor, cause the terminal to be configured to:
   determine whether a background application meets a preset suspension condition;
   suspend the background application when the background application meets the preset suspension condition by:
   pausing running of the background application; and
   releasing software and hardware resources allocated for the background application;
   suspend the background application on the terminal when the background application has a to-be-processed task that has not met a startup condition wherein the startup condition comprises a preset speed, and wherein the to-be-processed task has not met the startup condition when a speed of the terminal has not reached the preset speed; and
   disconnect a communication link between the background application and the communications interface when the terminal suspends the background application, wherein the communications interface is implemented by a radio communications circuit of the terminal, wherein an operating system of the terminal disconnects the communication link by disabling a preset network port associated with and located inside the radio communications circuit, and wherein the preset network port in the radio communications circuit establishes the communication link between the background application and the communications interface.

9. The terminal of claim 8, wherein the background application meets the preset suspension condition when the background application does not have any tasks being processed.

10. The terminal of claim 9, wherein the background application does not have any tasks being processed comprises either all of the tasks of the background application have been processed.

11. The terminal of claim 10, wherein the startup condition comprises a preset start time, wherein the to-be-processed task has not met the startup condition when a time has not reached the preset start time.

12. The terminal of claim 10, wherein the instructions further cause the terminal to be configured to activate the background application when the to-be-processed task meets the startup condition.

13. The terminal of claim 8, wherein the background application does not have a preset task, wherein the preset task is set by the terminal before the background application enters the background, and wherein the terminal instructs the background application to continue to execute the preset task after the background application enters the background.

14. The terminal of claim 8, wherein the preset network port comprises a socket port allocated by the terminal for the background application when the terminal supports Transmission Control Protocol/Internet Protocol (TCP/IP) protocol.

15. A computer program product comprising computer-executable instructions stored on a non-transitory computer-readable medium that, when executed by a processor, cause a terminal to:
   suspend a background application when the background application on the terminal meets a preset suspension condition by:
   pausing running of the background application; and
   releasing software and hardware resources allocated for the background application;
   suspend the background application on the terminal when the background application has a to-be-processed task that has not met a startup condition wherein the startup condition comprises a preset speed, and wherein the to-be-processed task has not met the startup condition when a speed of the terminal has not reached the preset speed; and disconnect a communication link between the background application and a communications interface when suspending the background application, wherein the communications interface is implemented by a radio communications circuit of the terminal, wherein an operating system of the terminal disconnects the communication link by disabling a preset network port associated with and located inside the radio communications circuit, and wherein the preset network port in the radio communications circuit establishes the communication link between the background application and the communications interface.

16. The computer program product of claim 15, wherein the instructions further cause the terminal to be configured to suspend the background application when the background application does not have any tasks being processed.

17. The computer program product of claim 16, wherein the background application does not have any tasks being processed comprises either all of the tasks of the background application have been processed.

18. The computer program product of claim 17, wherein the startup condition comprises a preset start time, wherein the to-be-processed task has not met a startup condition when a time of the terminal has not reached the preset start time.

19. The application management method of claim 1, wherein the radio communications circuit of the terminal comprises a radio frequency circuit of the terminal or a WI-FI apparatus, and wherein the operating system comprises an ANDROID operating system or an iOS operating system.

20. The terminal of claim 8, wherein the radio communications circuit of the terminal comprises a radio frequency circuit of the terminal or a WI-FI apparatus, and wherein the operating system comprises an ANDROID operating system or an iOS operating system.

* * * * *

UNITED STATES PATENT AND TRADEMARK OFFICE
CERTIFICATE OF CORRECTION

PATENT NO. : 11,409,567 B2
APPLICATION NO. : 16/753523
DATED : August 9, 2022
INVENTOR(S) : Yuhua Guo, Jing Zhao and Wen Huang It is certified that error appears in the above-identified patent and that said Letters Patent is hereby corrected as shown below:

On the Title Page

(57) Abstract should read: "An application method includes suspending a background application when the background application meets a preset condition and disconnecting a communication link between the background application and a communications module when suspending the background application."

Signed and Sealed this
Fourth Day of October, 2022

Katherine Kelly Vidal
*Director of the United States Patent and Trademark Office*